United States Patent

[11] 3,583,564

| [72] | Inventors | Wilhelm Peters<br>Seesen;<br>Heinz-Gunter Trelewsky; Heinrich<br>Hartmann, both of Braunschweig, all of,<br>Germany |
|---|---|---|
| [21] | Appl. No. | 829,987 |
| [22] | Filed | June 3, 1969 |
| [45] | Patented | June 8, 1971 |
| [73] | Assignee | Braunschweigische Maschinenbauanstalt<br>Braunschweig, Germany |
| [32] | Priority | June 5, 1968 |
| [33] | | Germany |
| [31] | | P 17 57 697.5 |

[54] APPARATUS FOR SEPARATION OF BEETS AND STONES BY DRY MEANS
12 Claims, 10 Drawing Figs.

| [52] | U.S. Cl. | 209/77 |
|---|---|---|
| [51] | Int. Cl. | B07c 5/12 |
| [50] | Field of Search | 209/76, 77, 78, 92 |

[56] References Cited
UNITED STATES PATENTS
3,211,288  10/1965  Peis..............................  209/78

*Primary Examiner*—Allen N. Knowles
*Attorney*—Ernest G. Montague

ABSTRACT: An apparatus for separation of beets and stones by dry means, which comprises an endless continuously moving separation band including a conveyor run. The conveyor run runs substantially in horizontal direction and is equipped with cam-or fingerlike driver elements disposed about perpendicularly to the surface of the conveyor run and elastically bendable merely by specific heavy stones. A feeding device is disposed at one end of the separation band and two striper brushes are disposed one behind the other above the conveyor run and driven in the same direction of rotation as the separation band. The striper brushes have bristles including points of the latter, and knob points of the fingerlike driver elements have a distance from the bristle points smaller than the thickness of the beets. The feeding device comprises means for feeding intermittently the goods to be conveyed directly to one end of the separation band. The separation band and the striper brushes are obliquely inclined crosswise to the direction of movement and, the rotary axes of the brushes converge with the lower disposed edge of the conveyor run in the direction of movement of the latter and in at least one plane about parallel to the conveyor run.

APPARATUS FOR SEPARATION OF BEETS AND STONES BY DRY MEANS

The present invention relates to an apparatus for separation of beets and stones by dry means.

Many proposals for separation of stones from potatoes have been known already. Thus, it is known to use a separating band set at an angle and having elastic clamping fingers. The thick clamping fingers have such spacing relative to each other that the stones, which hit the band with appreciably falling height are clamped between the clamping fingers due to their great kinetic energy. The light potatoes should, however, bounce off from the points of the cautchouc fingers and roll off sidewardly. The separation effect of this arrangement is rather low.

It is furthermore known, to apply a knob band guided with the upper run in a horizontal plane, in which the flexible knobs on the separating band are disposed so tight relative to each other and bendable such that only the stones sink in, by bending out or over the flexible knobs into the face formed by the knobs, while the light potatoes remain on the points of the knobs, without sinking into the latter. The knobs have been formed of cautchouc and are disposed at a distance of about 10 mm. from each other, whereby each individual element has a thickness of 3 mm. and a length of 35 mm. In order to remove the potatoes from the upper surface of the knob band, above this surface a continuous moving striper brush is arranged, the axis of which converges with one longitudinal edge of the band, whereby the brush is driven in the same peripheral direction as the separating band. By this arrangement, the potatoes are laterally deviated moved off and collected below the longitudinal edge of the band. One has already arranged two such striper brushes parallel to each other in connection with the conveyance direction of the band one behind the other, in order to move laterally also those potatoes which have not been gripped by the first brush.

These devices known for potatoes cannot, without any difficulty, be used for the separation of beets and stones. It has been shown in the practice, that the beets deflect laterally much more difficulty and can be much more difficulty separated from the stones than potatoes, since, due to their different configuration, they are inclined easily to clamp rigidly towards each other in case of accumulations in front of the striper brushes and for the other point, to pass the brushes without deflecting effect.

It is one object of the present invention to provide an apparatus for separation of beets and stones by dry means, wherein the known separating devices are developed such, that they are applicable for the separation of beets and stones and, in spite of a large through-put effect, show a good separation effect.

It is another object of the present invention to provide an apparatus for the separation of beets and stones by dry means, wherein the arrangement comprises an apparatus wherein on the end of the separating band intermittently the goods are provided, wherein the separating band and the striper brushes are inclined disposed crosswise to the direction of movement and wherein the rotary axes of the brushes converge with the lower disposed edge of the feed run in its movement direction.

In the apparatus of the present invention the goods to be separated reach intermittently or in portions the continuously running separating band, so that intermediate spaces remain between the individual quantities of the goods. The sections free from the goods on the band have been shown as of extreme importance for the practical operation, since the beets, crowded from the striper brushes rearwardly and laterally can escape into these sections, without disturbing themselves relative to each other in their rolling effect. This measure complies, however, only when with the desired purpose to a sufficient extent, if simultaneously the separating band and with the latter the striper brushes are additionally inclined crosswise to the direction of movement of the separating band. By this additional inclination, it is brought about that the beets gripped and pushed back by the first striper brush, namely those beets, which are disposed near the higher arranged longitudinal edge of the band can roll off laterally in the band sections remaining free between the intermittently fed good quantities, without other beets being in their way during the roll-off process. By this arrangement any accumulation in front of the striper brushes is avoided. Such accumulation would to a great extent obviate the striper function of the brushes. Without the additional inclination of the separating band, on the other hand, the deviated beets would remain in the intermediate spaces and by such occurrence just lead to an accumulation in front of the striper brush.

By the particular shape of the beets, they show the inclination, different from potatoes, particularly then when they are directed with their points in the direction of movement of the separating band, to pass without influence the striper brush. In order to make it possible that the beets are safely gripped by the following striper brush, it is suitable, to arrange between these two brushes a reversing device extending crosswise beyond the band surface, in particular in form of a rigid brush ledge such that the latter abuts the particular beets and brings the same into a position about crosswise to the movement direction of the band.

It is essential, that the brush points have a sufficient distance from the driver knobs, so that the bristles generally grip merely the beets resting on the knob points, while from the stones sinking into the driver face only the larger ones are engaged, yet due to their weight and the flexibility of the knobs and of the bristles, as the smaller not engaged stones remain embedded in the driver face. Due to this arrangement, the inclination relative to the horizontal of the feeding run of the separating band can be chosen relatively small, so that with safety the assurance is given that also in case of relatively round and heavy stones which are inclined to roll, no danger exists, to roll off sideways by rolling down the elastically bent knobs following the inclination of the band. The position of these stones is not influenced by the bristles. In this manner, also in case of a high band speed, a safe separation of stones and beets is assured.

The bristles of the second brush have a smaller point distance from the knobs of the separating band than the bristles of the first brush, whereby preferably the bristles of the second brush are appreciably softer than the bristles of the first brush. By the low point distance of the bristles of the second brush, it is assured, that by the second brush, also particularly small beets or the frequently occurring broken-off beet pieces, which rest on the knob points, are gripped. These broken pieces incline, due to their irregular shape, not to roll off. They are, however, likewise pressed to the side by the bristles of the second brush and are thrown off laterally from the band. In this case, the softer bristles of the second brush assure that, by these bristles, such stones sunk into the feeding face, which stone project over the points of the knobs, are not gripped by the relatively soft bristles, in particular since one deals here as a rule with relatively large and thereby heavy stones, while the soft bristles of the light small beets and broken-off beet pieces, respectively, can be swept off laterally. In relation to the heavier stones, the relatively soft bristles yield, however, upon engagement.

The separation effect of the two brushes can be brought to an optimum, by the arrangement according to which the number of revolutions can be chosen to be controlled endlessly and by setting to the prevailing characteristic of the separation goods (dry, wet). In this case, it is of particular advantage, to permit rotation of the second brush with a higher speed than the first one. The feeding of the goods to be separated to the separating band by the intermittently working apparatus takes place preferably from as low a height as possible, so that the beets do not sink in view of the kinetic energy likewise into the knob face.

With the apparatus, designed in accordance with the present invention, it is possible to obtain in a space-saving manner, that means for a relatively short separating path, in case of a high conveyor band speed, a safe separation of beets and stones in a dry manner, whereby soil and moisture, which often adhere to the beets and to the stones, do not influence the separation result.

In order to avoid that also stones are swept off from the range of the lower-disposed edge of the conveyor run by the second brush with the beets, it is advisable to provide between the brushes an apparatus which transfers the goods for the range of the lower-disposed edge of the feeding run in the direction towards a higher disposed edge, preferably a rotating conveyor with the range of the lower-disposed edge of the conveyor run striking feeding fingers. The beets which have been moved away thereby from the lower-disposed edge of the conveyor run are joined with safety by the second brush and are swept away by the run, while the stones themselves remain there with slight joining by the brushes on the run.

With the apparatus, designed in accordance with the present invention, it is possible in a space-saving manner, that means with a relatively short separating path in case of a high conveyor band speed, to bring about a safe separation of beets and stones in a dry manner.

With these and other objects in view which will become apparent in the following detailed description, the present invention, which is shown by example only, will be clearly understood in connection with the accompanying drawings, in which:

FIGS. 5a and 5b are fragmentary end views of the additional devices referred to in FIG. 5;

Figure 1:
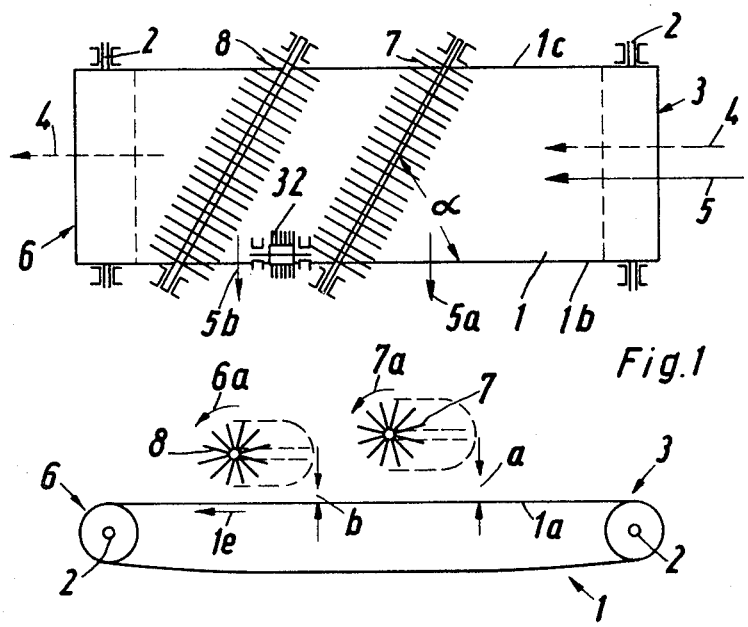
FIG. 1 is a schematic top plan view of a separation device designed in accordance with the present invention.

Referring now to the drawings, the apparatus designed in accordance with the present invention comprises an endlessly revolving separation band 1 which at its ends is guided about guiding rollers 2 of which at least one can be driven with a predetermined speed. As can be ascertained from FIG. 3, the axles of the guiding rollers 2 are disposed inclined relative to the horizontal 12 and crosswise to the direction of revolving, as well as form with the horizontal an angle $\beta$, which preferably has the size of about 10—18°. It is not necessary that the entire separation band has this inclination, it is merely of importance that in the actual separation section, the feeding run has the desired inclination.

The goods are fed to the separating band at one end in FIG. 1, namely at the end 3, as is indicated by arrows 4 and 5, whereby the arrow 4 is supposed to stand for the stones and the arrow 5 for the beets in the fed goods.

Figure 2:
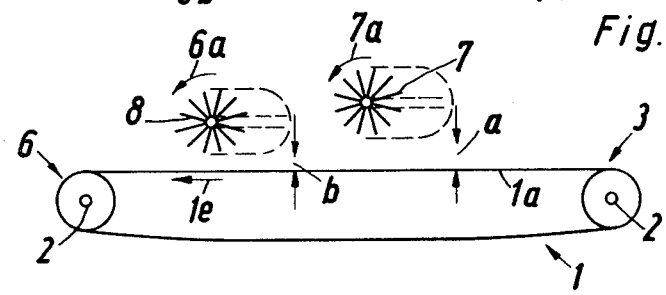
FIG. 2 is a section along the lines II–II of FIG. 3.
Figure 3:
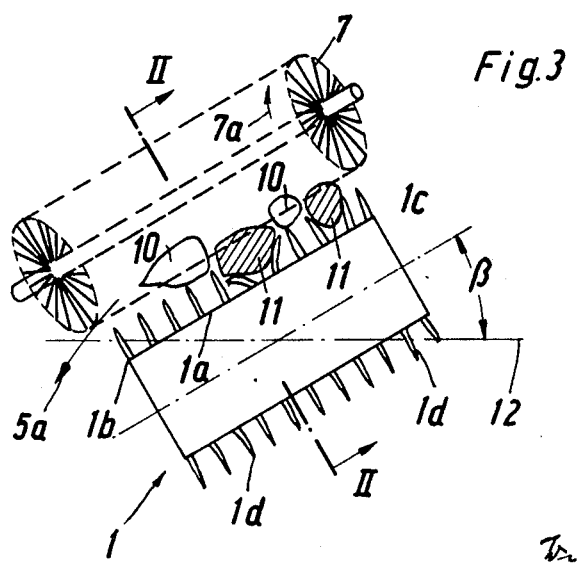
FIG. 3 is an end view of the apparatus disclosed in FIG. 1.

As can be recognized in FIG. 3, the separating band 1 is equipped over its entire outer face with knoblike fingers 1d which are distributed in predetermined spacings crosswise to the direction of conveyance, as well as in the direction of conveyance uniformly over the surface. The knoblike fingers are elastic, for instance, rubber fingers, whereby their length and their elasticity is chosen such, that they provide a conveyor face, in which materials, which exceed a predetermined specific weight, sink in, while materials, which have a low specific weight, remain resting on the points of the knobs. Since the specific weight of stones is about double of that of beets, the suitable elastic bendability for the fingers can easily be determined. The length of the fingers is chosen such thereby that normally occurring stones sink nearly completely into the conveying face formed by the knobs. The performance of the knob face relative to the stones 11 and the beets 10 is indicated in FIG. 3. The behavior is thereby not dependent upon the size of the stones and of the beets. Above the conveyor drum 1a of the separation band 1 in the shown example of FIGS. 1 and 2, two striper brushes are disposed one behind the other. The first striper brush 7, seen in the direction of conveyance, is arranged inclined with an angle $\alpha$ to the conveyance direction, whereby the angle $\alpha$, which is formed by the axis of the striper brush 7 with the lower-disposed edge 1b has preferably a size of about 45—75°. The striper brush 7 is driven in the direction of the arrow 7a, so that it rotates in the same direction as the separating band 1. The conveyor effect of the bristles of the brush 7a is thereby directed opposite to the conveyor effect of the knobs of the conveyor run 1a.

It is of importance that the axis of the brush 7 arranged in a plane parallel to the conveyor face of the driver band 1 has such distance from the conveyor band, that between the points of the knobs 1d and the points of the brush 7 a distance $a$ remains, which corresponds to about the median diameter of conventional beets. This distance $a$ can be set correspondingly. Simultaneously, the bristles of the brush 7 are relatively stiff, so that the bristles can grip safely all beets, which rest on the knobs 1d and project up into the rotating range of the bristles. As can be ascertained from FIG. 3, the distance $a$ is chosen such, that the relatively stiff bristles of the brush 7 cannot grip the stones 11 sunk into the conveyor face, even then, when the stones project beyond the surfaces or the points of the knobs 1d.

By the inclination of the axis relative to the longitudinal direction of the conveyor band, the correspondingly driven brush 7 conveys the beets gripped by the latter in the direction towards the lower-disposed edge 1b of the conveyor run 1a of the separating band 1. The brush extends thereby over the total width of the conveyor run, so that the brush can grip also beets near the high disposed edge 1c of the separation band.

The second striper brush 8 is arranged at a distance behind the first striper brush 7, as seen in the conveyance direction of the separation band 1. The axis of the brush 8 extends substantially parallel to the axis of the brush 7. However, the axis of the brush 8 is at a smaller distance from the surface of the conveyor run 1a, so that the bristles of the brush 8 have a point distance $b$ from the knobs of the separation band 1, which point distance $b$ is appreciably smaller than the distance $a$ of the points of the brush 7 and the knobs. Simultaneously, the bristles of the brush 8 are formed appreciably softer than the bristles of the brush 7, so that, on the one hand, the bristles 8 grip also smaller beets or broken beet pieces with safety and can convey in the direction toward the lower-disposed edge 1b of the separation band, however, in relation to the heavier stones, yield even then, when the latter project beyond the points of the knobs 1b, so that the embedded position of the stones is not influenced by the bristles of the brush 8. The second softer brush 8 is particularly effective when its rotary speed is relatively greater than that of the first brush 7.

As can be clearly ascertained from the above-stated description, the separation effect of the separation band 1 can be appreciably influenced by the arrangement of striper brushes 7 and 8 and the separation effect can be improved. In particular, the possibility exists in this arrangement to make the inclination angle $b$ of the separation band relative to the horizontal 12 appreciably smaller, than it would be necessary without the presence of brushes for a somewhat effective separation effect.

Based on the arrangement, the beets 5 fed at 3 are deviated at 5a by the brush 7 to the lower-disposed edge 1b, as long as one deals with normally large and complete beets, while small beets or broken beet parts are deviated by the brush 8 to the lower edge 1b corresponding to the arrow 5b. The stones fed likewise at 3, which are indicated by the arrow 4, run through the entire separation path without any obstacles, since the stones are sunk into the knob face and are not gripped by the deviation effect of the brushes 7 and 8. The stones 4 are thrown off therefore at the exit end 6 of the separation band. The separation effect of the described apparatus in accordance with FIGS. 1—3, could be influenced in a disadvantageous sense by the fact that, stones disposed within the range of the lower-disposed edge 1b of the conveyor run 1, are fed off with the beets. This can happen such, that the brushes 8 with the hard bristles push away the stones over the short conveyor path up to the edge 1b of the conveyor run and thereby sweep off the stones or the stones can, in case of a greater weight load of the range of the lower disposed edge 1b, fall off the band by the beets to be fed off, and in this manner reach into the beets to be fed off.

In order to avoid these drawbacks, a rotating conveyor 32 is provided between the brushes 7 and 8, as shown in FIG. 1, which has a wheel or roller with an axis extending parallel to the longitudinal direction of the run and strikes away with conveyor fingers over the range of the lower-disposed edge of the conveyor run 1, whereby its rotary direction is chosen such, that it exceeds the goods in the direction towards the higher disposed edge 1c of the run, so that the range of the lower-disposed edge is completely freed from the goods.

The beets moved away and thrown away, respectively, by the rotating conveyor 32 in the direction towards the edge 1c are safely moved and thrown off by the brush 8 again in the direction towards the lower-disposed edge 1b of the conveyor run, while the stones gripped by the conveyor 32 at their hitting point remain on the conveyor 1, particularly since they sink in during their return conveyance and upon its hitting the conveyor run comparatively deep into the knob face.

The rotating conveyor can be equipped with its own drive (not shown) or it can be driven with the drive for the conveyor run.

Instead of the rotating conveyor, it is also possible to provide other devices for transfer of the goods from the range of the lower-disposed edge of the run in the direction towards the run center, for instance, a keep-off rail.

The apparatus designed in accordance with the present invention can be used with particular advantage in a so-called beet piler, which serves the purpose of feeding the delivered beets after the cleaning into silos or onto large heeps from which the beets can be removed for further working in accordance with the requirements. Such a device is schematically shown in FIG. 4 (shown in a top plan view in FIG. 4).

Figure 4:
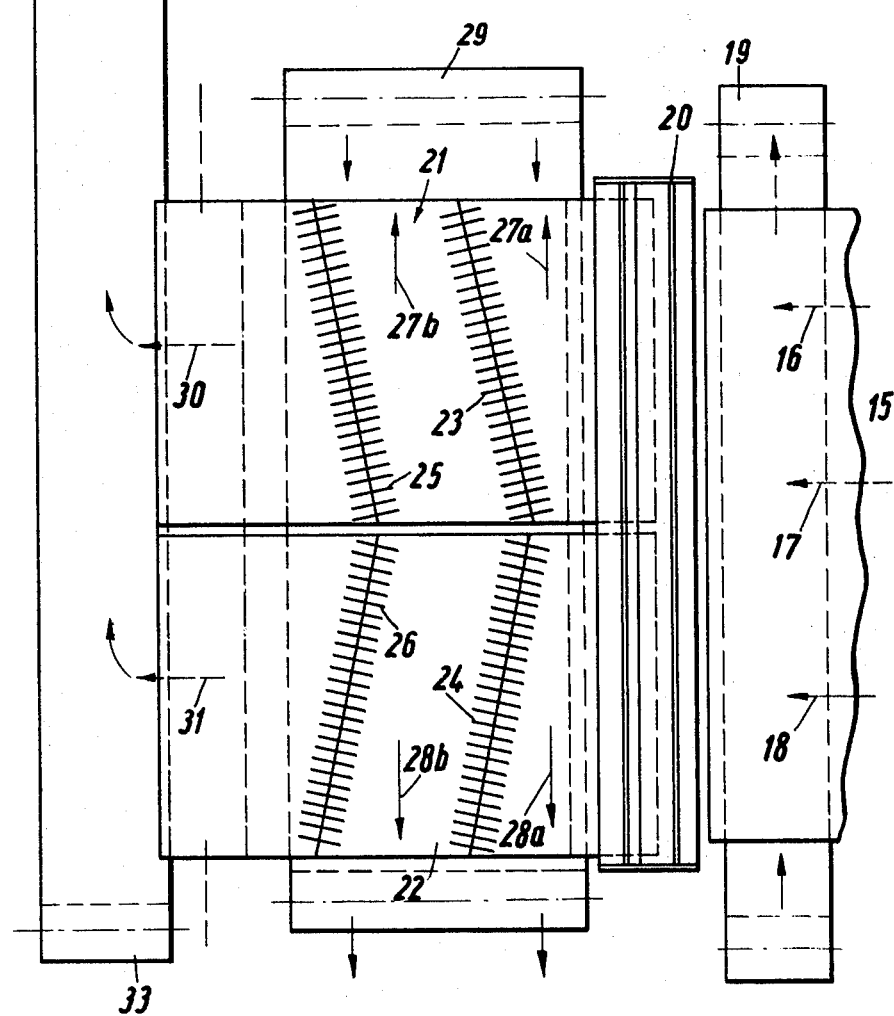
FIG. 4 is a schematic top plan view indicating the use of an apparatus designed in accordance with the present invention in connection with an arrangement, which serves the purpose to separate the goods applied thereto and to feed after the separation the beets to a beet silo or beet accumulation device.

The beets and stones are jointly fed with soil at the right side of FIG. 4, whereby the arrow 16 indicates the soil, the arrow 17 the stones and the arrow 18 the beets. The fed goods are brought onto a shaking grate 15. The latter has a double function, namely the first function of separating the soil, which falls through the grate and is fed off by a collecting band 19 crosswise to the conveyor direction. Simultaneously, the grate 19 has the task as a second function to distribute the fed goods remaining on the grate uniformly over the feeding width. From the shaking grate the goods, namely the beets and the stones, are fed to separating bands. The practice has shown, that an intermittent feeding of the goods onto the separating bands is of a great practical advantage. For this purpose in the shown arrangement of FIG. 4 between the shaking grate and the separating bands 21 and 22 is indicated an apparatus for intermittent feeding in form of a cell wheel 20 (or of a slide, a flap or the like), which is rotatable below the feeding and of the shaking grate and above the feeding end of the separating bands and also drivably mounted. The two parallel disposed separating bands 21 and 22 arranged closely next to each other follow the joint cell wheel 20, which separating bands 21 and 22 are inclined to opposite sides, namely towards the outsides, downwardly crosswise to the conveyor device and obliquely to the horizontal. The two separating bands form also in cross section a rooflike arrangement. The separating bands are formed in the same manner as it occurs from FIGS. 1—3, whereby corresponding pairs of brushes 23, 25 and 24, 26, respectively, are coordinated thereto, which provide, that the beets and the parts of the beets are fed off in correspondence with the arrows 27a, 27b, and 28a and 28b, respectively. The beets fall onto a joint connecting band 29 with which the separated beets and sections of beets are fed to the piler. The stones are, however, corresponding to the arrows 30 and 31, joined by the separating bands up to the exit ends of these bands and fall onto a collecting band 33, with which the stones are fed into a corresponding collecting device.

The two separating bands can, however, be arranged advantageously such, that they are inwardly crosswise to the conveyor direction inclined to the horizontal. In this case, two separate alternately operating feeding devices follow the joint shaking grate, while the joined collecting band for the separated beets extends between the separating bands disposed in V-form and parallel to the latter.

Figure 5:
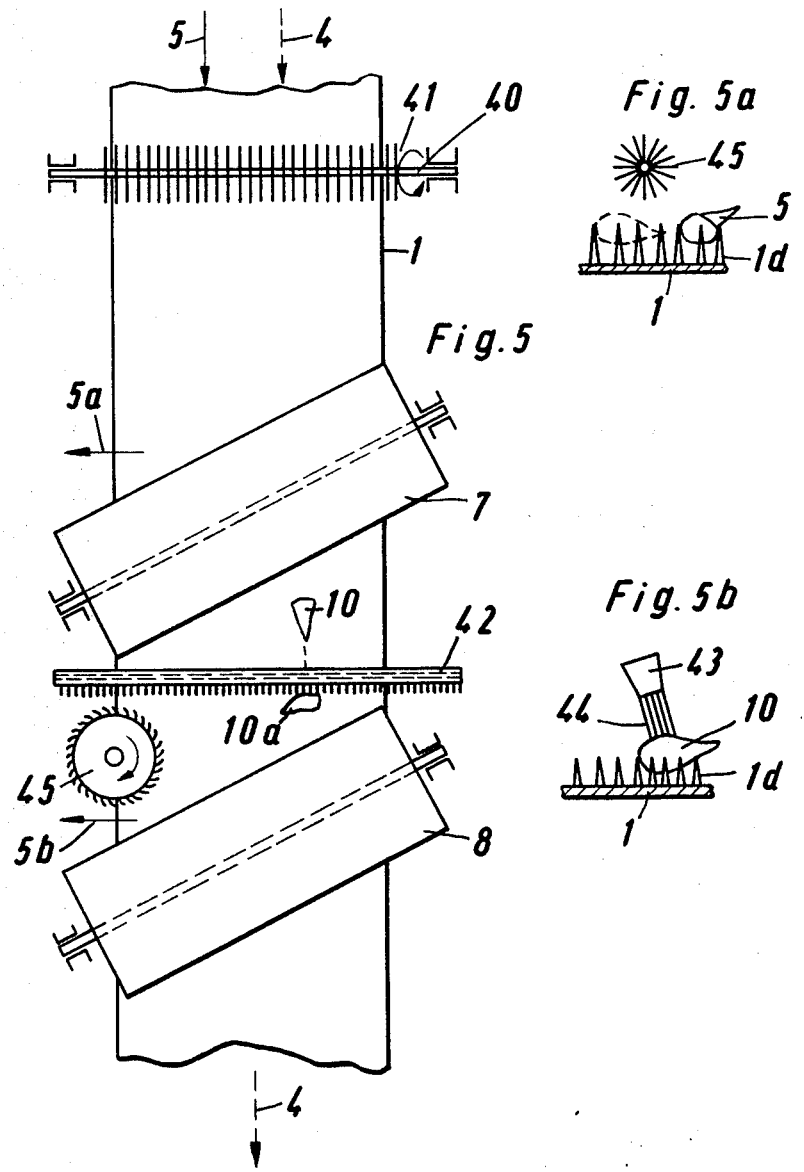
FIG. 5 is a top plan view of a part section of an apparatus equipped with an additional device in accordance with FIG. 1.

The device disclosed in FIG. 5 in a top plan view corresponds in its structure to the arrangement disclosed in FIGS. 1—3. In FIG. 5 those elements which are also in the arrangement according to FIGS. 1—3 are carrying the same numerals chosen in FIGS. 1—3.

In the apparatus according to FIG. 5, in addition to the striper brushes 7 and 8, still a divider brush 40 is provided receiving the brushes 7 and 8. The direction of rotation of the divider brush 40 corresponds with the arrow 41, that means, that its bristles grip the oncoming beets, as much as they are gripped by the brush 40, are pushed back against the direction of conveyance of the band 1.

The distance between the bristle points of the brush 40 and the knobs 1d of the knob band 1 is chosen such, as shown in FIGS. 5a, that beets 5 and stones 4 which are disposed in one layer on the knob band 1 are hardly or not at all touched by the brush 40. On the other hand, beets and stones which are disposed in a second or third layer on the knob band 1 are pushed back by means of the brush 40 into the free intermediate spaces, which form then between the intermittently fed goods on the knob band. Due to the return pushing movement simultaneously a lateral spreading of the beets and the stones takes place, as much as they are disposed in a second or third layer on the knob band.

By the arrangement of the divider brush, the separating effect is appreciably improved, since otherwise the beets and stones disposed in the second or third layer are gripped from the striper brushes 7 and 8 serving the separation and deviated laterally.

In the arrangement according to FIG. 5, in comparison to the arrangement of the apparatus in accordance with FIGS. 1—3, an additional reversing device 42 in form of a brush ledge is provided between the striper brushes 7 and 8. It deals here with a ledge 43 which is preferably adjustable as to its height with inclined disposed brushes in the direction of conveyance of the goods, as it is clearly shown in FIG. 5b. The distance between the knobs 1d and the points of the bristles 44 is relatively low, so that the bristles engage the beets disposed on the knob bands, which have passed already the first brush 7. The beets 10 remaining on the knob band 1 after passing of the brush 7 are reversed by means of the brush ledge 42, if the longitudinal axis of the beets extends parallel to the direction of transportation. In this position of the beets, the points of the bristles 44 rest in accordance with FIG. 5b during the run-through of the beets on the thickened section, so that the points of the beets 10 due to the withholding force exerted by the bristles swing out of the knobs 1d and upon release of the beets 10 through the bristles 44 due to the resiliency of the elastic knobs are thrown slightly upwardly, whereby they generally change their position and substantially come to lie with their longitudinal axis crosswise to the transport direction (see beet 10a in FIG. 5). By the reversing device, which has been proven already in the practice in the direction of the above-described operation, it is brought about that simultaneously a loosening of the beets and of the stones takes place, so that the following separation by the brush 8 is favored.

As much as the beets prior to reaching the brush ledge 42 are disposed with their longitudinal axis crosswise to the transporting direction, they pass the brush ledge 42 without experiencing a change in their position. The beets lying with their longitudinal axes crosswise to the transport direction and should remain without influence by the transport ledge, since their position on the band is favorable for the lateral deviation by means of the following brush 8.

In the arrangement according to FIG. 5 between the brushes 7 and 8 is likewise a rotating conveyor 45 provided, which deviating from the arrangement in accordance with FIG. 1, has an axis extending perpendicularly to the longitudinal direction of the run and in its effect, however, corresponds with the conveyor 42 in FIG. 1, in order to fed the beets and stones disposed at the lower arranged edge 1b of the conveyor band prior to reaching the brush 8 in the direction towards the band center.

Figure 6:
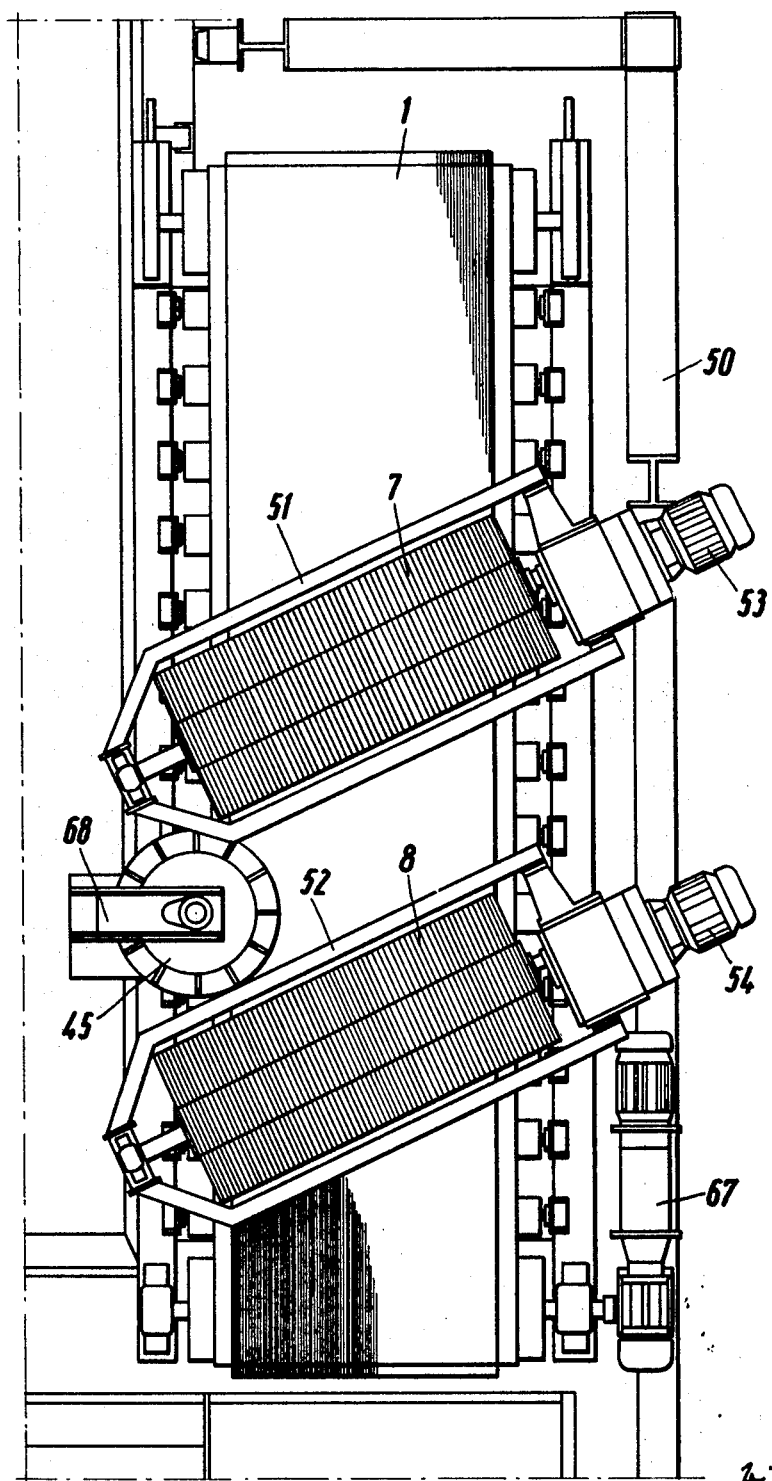
FIG. 6 is a top plan view corresponding to the arrangement shown in FIG. 1 indicating the constructive formation of the separating device without the device for feeding of the goods to the separation device.
Figure 7:
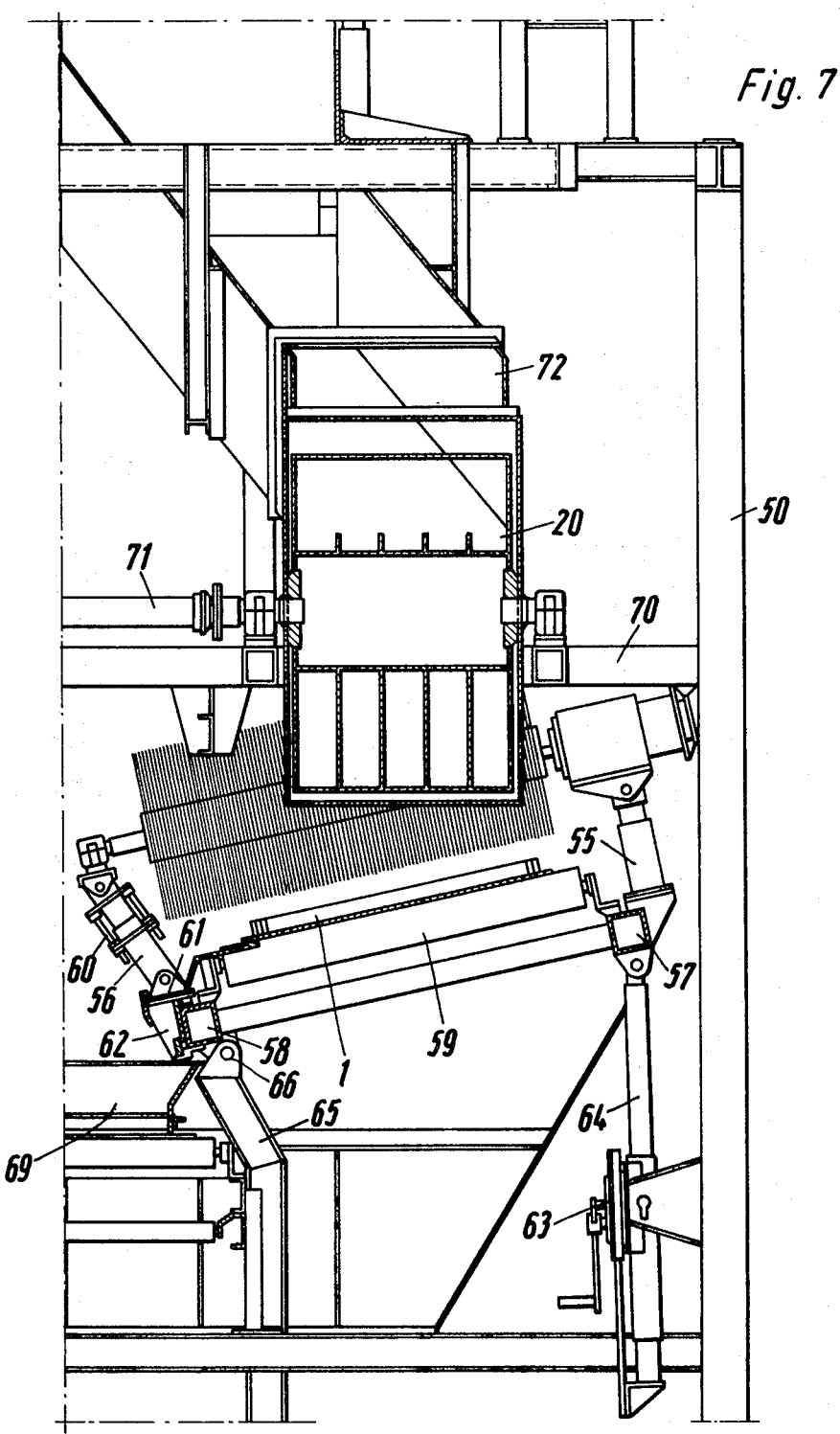
FIG. 7 is an end view similar to FIG. 3 of the device disclosed in FIG. 6, and in particular a section along the lines VII–VII of FIG. 8.
Figure 8:
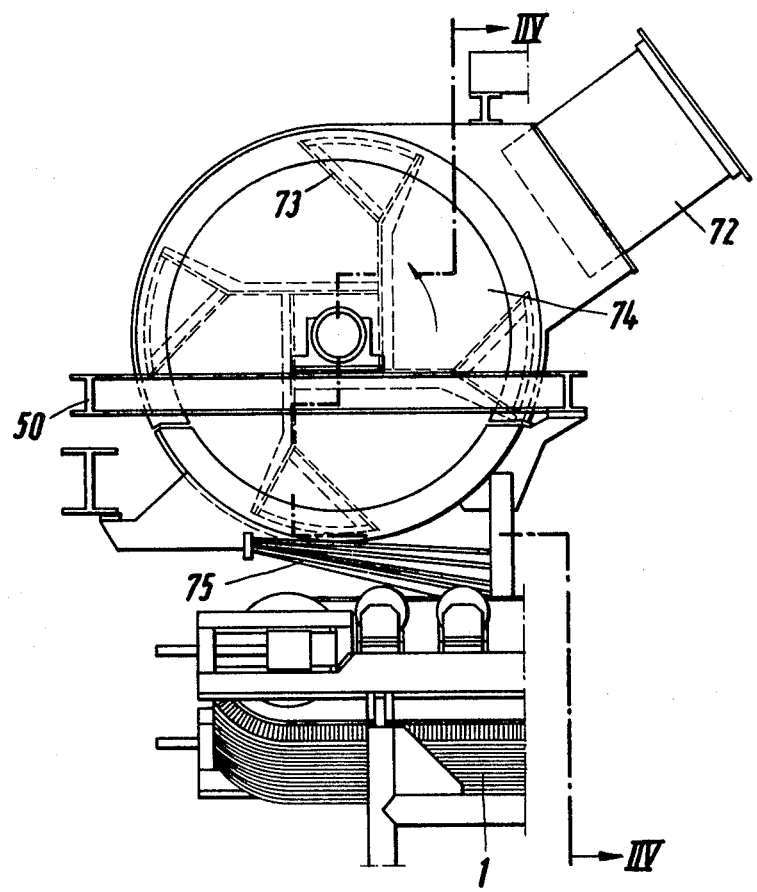
FIG. 8 is a side elevation of the apparatus indicating the range of the feeding of the goods.

The constructive build up of the arrangement corresponding with the schematic FIGS. 1, 3 and 5 is obtainable from the showings in FIGS. 6, 7 and 8.

From the mentioned figures, one recognizes that the apparatus has a carrying skeleton 50 in which the individual elements of the separating device are received.

FIG. 6 shows that the striper brushes 7 and 8 are retained in the frames 51 and 52, which simultaneously serve the reception of the driving motors 53 and 54.

The frames 51 and 52 are in accordance with FIG. 7, disposed over length-variable supports 55 and 56 on longitudinal beams 57 and 58, which serve simultaneously the support of the carrying rollers 59 of the knob band 1.

The ends remote from the motors 53 and 54 of the frames 51 and 52 are connected by means of ball joints with the length-variable support 56, whereby the support 56 is equipped with an arresting device 60 for securing the height.

One recognizes from FIGS. 6 and 7 that the brushes 7 and 8 with their complementary frames 51 and 52, as well as the motors 53 and 54 are to be transferred with their longitudinal axes in different height positions relative to the knob band 1 and in particular by means of the length-variable supports 55 and 56 securable as to their height.

The supports 56 are retained over slides 61 on a console 62 of the longitudinal beam 58 and displaceable in longitudinal direction and securable in selective positions, so that the brushes 7 and 8 are settable separate into different angular positions of their longitudinal axes in relation to the longitudinal axis of the knob band.

The knob band 1 jointly with the brushes 7 and 8 can be transferred into different angular positions in relation to the horizontal. For this purpose serves a height adjustment device 63, which is disposed at the supports 64 of the longitudinal beam 57. Since the other longitudinal beam 58 at its complementary support 65 is secured by means of a pivot 66, swinging movements of the band 1 with the striper brushes about the pivot point 66 can be performed without difficulty.

For the drive of the knob band serves a motor 67 which by proper arrangement joins the movement in case of adjustment movements of the band 1.

In FIG. 6 is furthermore the rotating conveyor 45 recognizable, which in its design is made in a corresponding showing as indicated in the schematic drawing of FIG. 5. The conveyor 45 can be transferred by means of a slide guide 68 in the direction crosswise to the band in different positions and secured therein. From FIG. 7 is recognizable laterally next to the lower-disposed edge of the knob band 1 a further conveyor 69, on which the beets gripped by the striper brushes 7 and 8 slide and are moved away.

Above the knob band is disposed at the end of the feeding for the goods the cell wheel and the cell roller 20, respectively, which is mounted on a cross beam 70 of the skeleton 50 and is driven by a motor (not shown) by means of the shaft 71. The cell wheel is disposed at the exit end of a member 72 through which, due to the inclined arrangement, the beets and the stones are fed.

In the cell wheel 20 are, as particularly clearly shown in FIG. 8, corresponding structural parts 73 are provided, which serve the formation of pockets 74 for the goods, so that an intermittent feeding of the goods is obtained.

Below the cell wheel is provided a divider grate 75, which feeds the goods to the knob band 1. The divider grate 75 has, among others, the task, to cause a spreading of the goods fed thereto, so that the knob band is used as much as possible over the entire width.

While we have disclosed several embodiments of the present invention, it is to be understood that these embodiments are given by example only and not in a limiting sense.

We claim:

1. An apparatus for separation of beets and stones by dry means, comprising
    an endless continuously moving separation band,
        including a conveyor run,
    said conveyor run running substantially in horizontal direction and being equipped with cam-or fingerlike driver elements including knob points disposed about perpendicularly to the surface of said conveyor run and elastically bendable merely by the specific heavy stones,
    a feeding device at one end of said separation band,
    two striper brushes disposed one behind the other above said conveyor run and driven in the same direction of rotation as said separation band,
    said striper brushes having bristles including points of the latter,
    said bristle points having a distance from said knob points of said fingerlike driver elements smaller than the thickness of said beets,
    said feeding device comprising means for feeding intermittently the goods to be conveyed directly to said one end of said separation band,
    said separation band and said striper brushes being obliquely inclined crosswise to the direction of movement and,
    the rotary axes of said brushes converging with the lower disposed edge of said conveyor run in the direction of movement of the latter and in at least one plane about parallel to the conveyor run.

2. The apparatus, as set forth in claim 1, which includes means for transfering said brushes into different angular positions relative to a central longitudinal line of said conveyor run, as well as into different angular positions to the conveyor face of said conveyor run.

3. The apparatus as set forth in claim 1, wherein said bristle points of the second of said striper brushes seen in the direction of movement of said beets have a smaller distance from said points of said fingerlike driver elements than the distance from the bristle points of the first of said striper brushes.

4. The apparatus, as set forth in claim 3, wherein the distance between said points is adjustable, and said distance from said points of said first striper brush amount to about 30—80 mm. and from said points of said second striper brush amounts to about 5—40 mm.

5. The apparatus, as set froth in claim 3, wherein said bristles of said first striper brush are markedly stiffer than those of said second striper brush.

6. The apparatus, as set forth in claim 3, wherein the numbers of revolution of said brushes are endlessly controllable independently from each other, and said second brush rotates with greater peripheral speed than said first brush.

7. The apparatus, as set forth in claim 6, wherein said converging angle between the axis of said striper brushes and the lower disposed conveyor run edge amounts to about 45—75°.

8. The apparatus, as set forth in claim 1, wherein said feeding device comprises a cell roller feeding the goods to be separated onto said separation band from a low height.

9. The apparatus, as set forth in claim 1, wherein
two of said separation bands are provided which move parallel relative to each other and inclined rooflike of V-shaped relative to each other crosswise to the direction of conveyance and inclined relative to the horizontal, and
said feeding device operating jointly for both of said bands and intermittently is coordinated to said bands.

10. The apparatus, as set forth in claim 3, which includes
means disposed between said striper brushes for transferring the goods from the range of the lower disposed edge of said conveyor run in the direction towards the higher disposed edge, and
said transferring means include conveyor fingers striking over the range of said lower disposed edge of said conveyor run.

11. The apparatus, as set forth in claim 3, which includes
a turning device in form of a brush ledge disposed between the two striper brushes and aligning said beets crosswise to the direction of conveyance.

12. The apparatus, as set forth in claim 3, which includes
a spreading device in form of a rotatable brush disposed at about 90° to the direction of conveyance and arranged between said feeding device and the first of said striper brushes.